US008838505B2

(12) United States Patent
Jang et al.

(10) Patent No.: US 8,838,505 B2
(45) Date of Patent: Sep. 16, 2014

(54) SCHEDULE MANAGEMENT SYSTEM USING INTERACTIVE ROBOT AND METHOD AND COMPUTER-READABLE MEDIUM THEREOF (75) Inventors: Jun Won Jang, Yongin-si (KR); Woo Sup Han, Yongin-si (KR)

(73) Assignee: Samsung Electronics Co., Ltd., Suwon (KR)

(*) Notice: Subject to any disclaimer, the term of this patent is extended or adjusted under 35 U.S.C. 154(b) by 256 days.

(21) Appl. No.: 12/948,397

(22) Filed: Nov. 17, 2010

(65) Prior Publication Data
US 2011/0125540 A1 May 26, 2011

(30) Foreign Application Priority Data

Nov. 24, 2009 (KR) .......................... 10-2009-114148

(51) Int. Cl.
*G06F 15/18* (2006.01)
*G06Q 10/10* (2012.01)
*G06Q 10/06* (2012.01)

(52) U.S. Cl.
CPC .......... *G06Q 10/10* (2013.01); *G06Q 10/06311* (2013.01)

USPC .............. 706/12; 704/246; 704/275; 706/25; 706/45; 706/46; 705/2; 707/5

(58) Field of Classification Search
None
See application file for complete search history.

(56) References Cited

U.S. PATENT DOCUMENTS

| | | | |
|---|---|---|---|
| 6,330,539 B1 * | 12/2001 | Takayama et al. | 704/275 |
| 2007/0118555 A1 * | 5/2007 | Go et al. | 707/103 R |
| 2007/0198444 A1 * | 8/2007 | Movellan et al. | 706/12 |
| 2008/0294617 A1 * | 11/2008 | Chakrabarti et al. | 707/5 |
| 2009/0112782 A1 * | 4/2009 | Cross et al. | 706/45 |

* cited by examiner

Primary Examiner — Kakali Chaki
Assistant Examiner — Luis Sitiriche
(74) Attorney, Agent, or Firm — Staas & Halsey LLP (57) ABSTRACT An interactive robot may audibly communicate with a user, determine whether reasoning is performed according to a reasoning weight of a schedule if there is a schedule to be recommended by the interactive robot during conversation between the interactive robot and the user, perform reasoning using information collected in a database if reasoning is necessary, and provide schedule information to the user.

19 Claims, 7 Drawing Sheets

| SCHEDULE | REASONING WEIGHT |
|---|---|
| EXERCISE(S1) | 0.7 |
| PICNIC(S2) | 0.4 |
| SHOPPING(S3) | 0.8 |
| BUSINESS TRIP(S4) | 0.5 |
| TRAVEL(S5) | 0.3 |

SCHEDULE MANAGEMENT SYSTEM USING INTERACTIVE ROBOT AND METHOD AND COMPUTER-READABLE MEDIUM THEREOF

CROSS-REFERENCE TO RELATED APPLICATIONS

This application claims the benefit of Korean Patent Application No. 10-2009-0114148, filed on Nov. 24, 2009 in the Korean Intellectual Property Office, the disclosure of which is incorporated herein by reference.

BACKGROUND

1. Field

Example embodiments relate to a schedule management system using an interactive robot, which actively provides schedule information using the interactive robot, and a method and computer-readable medium thereof.

2. Description of the Related Art

A schedule of an individual or a team is mostly managed by performing scheduling using a schedule management program installed in a computer, a mobile telephone, or a Personal Digital Assistant (PDA).

Intelligent robots are expected to come into wide use in homes and offices in the near future. Examples of such intelligent robots include a domestic assistant robot, a secretarial robot, or an entertainment robot in place of a human. An intelligent robot is also called an interactive robot, because the robot is able to converse with a human.

Research into release of a product to audibly and visually output schedule information to reduce a burden on schedule management of a user has been actively conducted. The simple report of the schedule information prepared by the interactive robot with time may not live up to user expectations and may not satisfy the user.

In order to provide satisfactory schedule information through communication between a user and an interactive robot, it is important to analyze the conversation using a database accumulated during conversation with the user to provide schedule information. However, since it is difficult to apply all of a user's various tastes or individual preferences to construct a database, there is a limitation in provision of schedule information satisfying users. Even when some users may be satisfied, other users may not be satisfied.

SUMMARY

Therefore, it is an aspect of the example embodiments to provide a high-quality service for schedule management to a user by enabling a robot to provide intelligent schedule information obtained without a user request.

The foregoing and/or other aspects are achieved by providing a schedule management system using an interactive robot, the schedule management system including the interactive robot audibly communicating with a user, wherein the interactive robot includes a conversation management unit to determine whether reasoning is performed in order to obtain schedule information to be provided to the user and to control an operation to audibly provide the schedule information to the user; and a reasoning unit to perform reasoning using information collected by the interactive robot to the obtain the schedule information and to provide the obtained schedule information to the conversation management unit.

The interactive robot may further include a reasoning weight storage unit to store reasoning weights indicating reasoning appropriacy of schedules, and, if there is at least one schedule to be recommended by the robot itself, the conversation management unit may determine whether or not reasoning is performed according to a reasoning weight corresponding to the schedule to be recommended.

The conversation management unit may determine whether reasoning is performed, by analyzing conversation about a request for schedule recommendation of the user.

The reasoning unit may perform reasoning using one of a probabilistic reasoning method and a logic reasoning method to obtain the schedule information.

The conversation management unit may analyze conversation to determine whether there is a schedule to be recommended by the robot itself.

The conversation management unit may compare the reasoning weights of the schedules with a reference value to divide the schedules into a first group of schedules which do not require reasoning and a second group of schedules which require reasoning, and determine whether reasoning is performed depending on to which a group of the recommended schedule.

The reasoning unit may update the reasoning weights which are initially set in the reasoning weight storage unit.

The schedule management system may further include a schedule management server and a web server connected to the interactive robot via a network.

The interactive robot may further include a database unit including a situation information database having a storage to store situation information including a peripheral environment of the robot and a user state, a schedule management database having a storage to store schedule management information about registration, retrieval, modification or deletion of a schedule for schedule management, which is provided by the schedule management server, a web information database having a storage to store web information associated with weather, news and events collected in a web environment from the web server, an evaluation information database having a storage to store user evaluation information according to reaction of the user during conversation, and a recommendation information database having a storage to store recommendation information including information indicating whether there is a schedule to be recommended and a recommendation frequency.

The reasoning unit may perform reasoning using at least one piece of information stored in the database unit to calculate the reasoning weights and update the reasoning weights to the calculated reasoning weights.

The reasoning unit may calculate the reasoning weights using a BaysianBavesian network.

The interactive robot may audibly output the schedule information if a schedule report condition set in advance is satisfied.

The foregoing and/or other aspects are achieved by providing a schedule management method using an interactive robot, the schedule management method including: determining, by a computer, whether reasoning is performed, in order to obtain schedule information to be provided to a user during conversation between the interactive robot and the user; performing reasoning, by the computer, using information collected by the interactive robot to obtain the schedule information; and audibly outputting, by the computer, the schedule information obtained by reasoning to provide the schedule information to the user.

One of a probabilistic reasoning method and a logical reasoning method may be used in order to obtain the schedule information.

The schedule management method may further include analyzing conversation about a request for schedule recommendation of the user to determine whether reasoning is performed.

The schedule management method may further include analyzing conversation to determine whether there is a schedule to be recommended to the user by the robot itself and comparing a reasoning weight of the schedule to be recommended with a reference value to determine whether reasoning is performed if it is determined that there is a schedule to be recommended.

The reasoning weight may indicate reasoning appropriacy of each schedule and the reasoning weight may be updated using the information collected by the interactive robot.

The collected information may include situation information including a peripheral environment of the robot and a user state, schedule management information about registration, retrieval, modification or deletion of a schedule for schedule management, web information associated with weather, news and events collected in a web environment, user evaluation information according to reaction of the user during conversation, and recommendation information including information indicating whether there is a schedule to be recommended and a recommendation frequency.

Reasoning may be performed using one piece of the collected information to calculate a reasoning weight, the reasoning weight may be updated to the calculated reasoning weight, and a Bayesian network may be used as a reasoning method calculating the reasoning weight.

The schedule information may be audibly output if a schedule report condition set in advance is satisfied.

The foregoing and/or other aspects are achieved by providing a method, comprising determining, by a robot having a computer, whether to provide schedule information to a user responsive to a conversation between the user and the robot, providing, by the robot having the computer, the schedule information to the user based on an analysis of the conversation by the robot and audibly outputting, by the robot having the computer, information to the user based on the analysis of the conversation.

According to the example embodiments, the robot itself may provide schedule information obtained by reasoning without depending on the user's request to reduce user burden related to schedule management and to provide more suitable and beneficial schedule information to the user.

The foregoing and/or other aspects are achieved by providing at least one non-transitory computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings.

Figure 1:
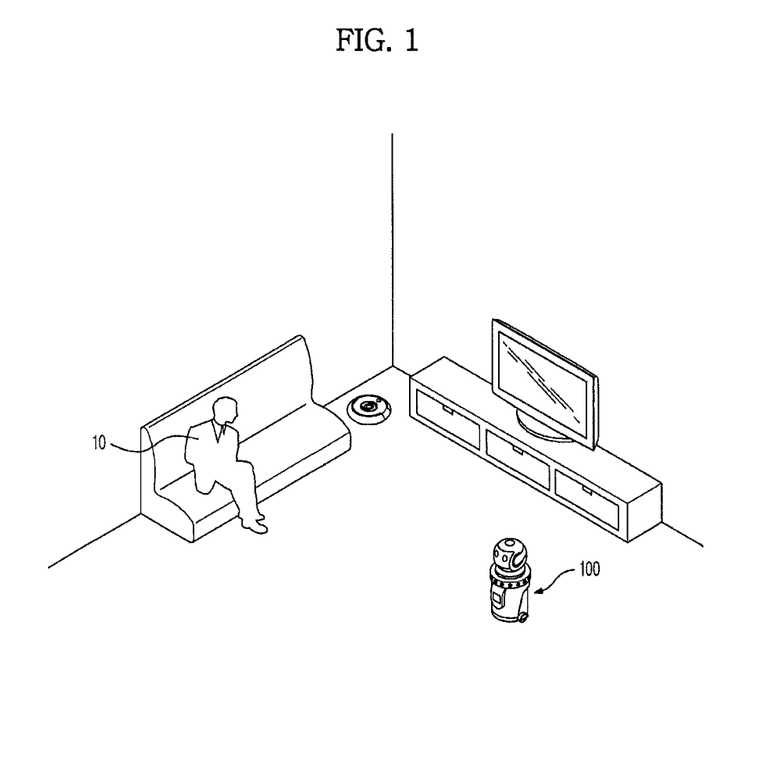
FIG. 1 is a diagram showing an example of using a schedule management system using an interactive robot according to example embodiments.

FIG. 1 is a diagram showing an example of using a schedule management system using an interactive robot according to example embodiments.

An interactive robot 100 may provide schedule information in response to a request of a user 10. The interactive robot 100 may include a movement unit to move the robot within an action space, may receive power from a charging station, and may audibly communicate with the user 10.

The interactive robot 100 may communicate with a schedule management server 300 and a web server 400 via a network 200. Although the example network 200 is implemented in the example embodiments, the embodiments are not limited thereto and the network 200 may be implemented by heterogeneous communication networks having different physical or communication protocols. For example, the robot may communicate with the schedule management server 300 via a Local Area Network (LAN) and communicate with the web server 400 via the Internet.

Figure 2:
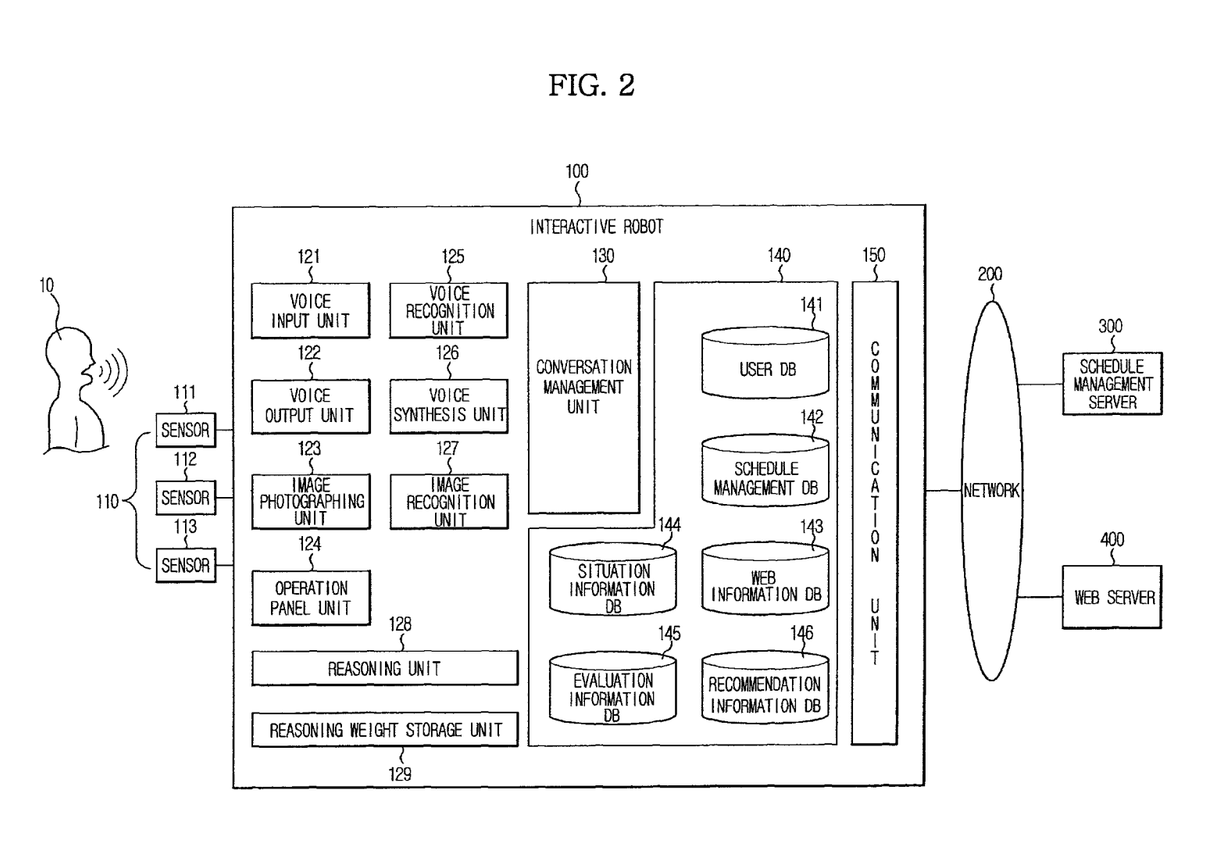
FIG. 2 is a block diagram of a schedule management system using an interactive robot according to example embodiments.

The interactive robot 100 may include a sensor unit 110 to measure peripheral environment information of the robot. The sensor unit 110 may include, but is not limited to, a temperature sensor 111, a touch sensor 112 and an illumination sensor 113, which may be selectively employed according to the environment information to be measured.

A voice input unit 121 may be implemented by a microphone to receive the voice of the user.

A voice recognition unit 125 may determine a user's language based on the user's voice input through the voice input unit 121, transform the user's language into the text of the language, and provide the text of the language to a conversation management unit 130.

The conversation management unit 130 may control the overall conversation with the user 10, understand and respond to the text of the language of the user 10, generate text of the language of the user when asking the user a question, and provides the text of the language to a voice synthesis unit 126.

The voice synthesis unit 126 may transform the received text of the language of the user into a voice signal, synthesize the voice signal, and provide the voice signal to a voice output unit 122.

The voice output unit 122 may be implemented by a speaker to amplify the received voice signal to a proper level and to output the amplified voice signal.

The image photographing unit 123 may photograph the peripheral environment of the robot including the user 10 and provide the photographed image to an image recognition unit 127.

The image recognition unit 127 may recognize the facial expression of the user 10 using the photographed image and provide information about the recognized facial expression of the user to the conversation management unit 130. The information about the facial expression of the user may be acquired using an algorithm to analyze the features of the image in order to roughly distinguish a smiling face, an angry face, and a speaking face according to the facial features. The information about the facial expression of the user may be used to recognize the state of the user 10.

The conversation management unit 130 may audibly perform communication to identify the user who is a speaker and estimate the state of the user 10 based on the information about the facial expression of the user.

An operation panel unit 124 may be implemented by a touch screen to enable the user 10 to input a command or to display information to be provided to the user 10.

A reasoning unit 128 and a reasoning weight storage unit 129 may be used to reason and obtain adequate schedule information. The reasoning weight storage unit 129 may store reasoning weights which are initially set with respect to schedules. The reasoning weights of the schedules may be updated.

When the robot has a schedule which will be recommended to the user 10, the conversation management unit 130 may retrieve the reasoning weight of the schedule to be recommended, compare the reasoning weight of the schedule to be recommended with a predetermined reference value, and determine whether or not reasoning is performed. If the reasoning is necessary, the conversation management unit 130 may output a control signal to instruct the reasoning unit 128 to perform reasoning.

The reasoning unit 128 may reason schedule information suitable for the user 10 using information collected in a database unit 140 under the control of the conversation management unit 130, and provide the schedule information obtained through reasoning to the conversation management unit 130. The reasoning unit 128 may use a Bayesian network as a probabilistic reasoning method or a description logic as a logical reasoning method.

A communication unit 150 may be used to communicate with the schedule management server 300 and the web server 400 and to transmit or receive information to or from the server according to a predetermined communication protocol.

The schedule management server 300 may store a result of executing schedule management such as registration, retrieval, modification or deletion of a schedule. The schedule management server 300 may update stored schedule management information according to the request of the interactive robot 100 or an external client, and provide schedule information stored in the interactive robot 10 via the network 200 or provide the stored schedule information according to the request of the external client.

The web server 400 may provide web information collected in a web environment, such as weather, news or events, to the interactive robot 100 via the network 200.

The database unit 140 may include a user database 141, a schedule management database 142, a web information database 143, a situation information database 144, an evaluation information database 145 and a recommendation information database 146.

The user database 141 may store user information to authenticate the user 10, the schedule management database 142 may store schedule information set by the user 10 or schedule information received from the schedule management server 300, and the web information database 143 may store web information received from the web server 400.

The situation information database 144 may store environment information measured by the sensor unit 110, situation information such as information about the facial expression of the user 10 recognized through image recognition, and user state information detected during conversation.

The evaluation information database 145 may store user evaluation information according to the reaction of the user during conversation, and the recommendation information database 146 may store recommendation information of schedules, such as information indicating whether there is a schedule to be recommended and a recommendation frequency, when the user requests schedule recommendation and the robot has a schedule to recommend by reasoning.

When the registration, retrieval, modification or deletion of the schedules is executed for schedule management, when schedule information obtained by reasoning or retrieved schedule information is audibly output and the user evaluates the schedule information, or when information measured or acquired by the robot or information received from the schedule management server 300 and the web server 400 is changed, the information stored in the databases of the database unit 140 may be updated.

During conversation between the interactive robot 100 and the user 10, there may be greeting speech, speech to manage a schedule, i.e., speech to change the existing schedule or speech to register a new schedule, speech to request recommendation of an adequate schedule, or speech to change the topic of conversation to an issued event or a matter of concern.

If the user's intention is obvious during conversation, such as a request for schedule recommendation and a request for schedule management, the robot 100 may respond to the user's intention. A schedule report condition may be set in advance and the interactive robot 100 may automatically report a schedule without the user's request if the schedule report condition is satisfied. As an example of the schedule report condition, a time when a specific schedule is reported may be set in advance or a schedule report period may be set in advance.

Even when the user's intention is not obvious in association with schedule recommendation during conversation, the conversation management unit 130 may analyze the conversation and obtain and report a schedule if it is determined that schedule recommendation is necessary for the user 10. The determination of whether schedule recommendation is necessary for the user is not performed with respect to only one schedule, but may be performed with respect to a plurality of schedules.

For example, when the user 10 asks "How's today's weather?" during conversation, the interactive robot 100 may determine that "exercise" or "shopping" needs to be recommended as a schedule suitable for the user 10, separately from a responding operation to audibly output weather information. If it is determined that schedule recommendation is necessary for the user 10 without the user's request, it is determined whether reasoning is performed when information about a schedule to be recommended is acquired.

Figure 3:
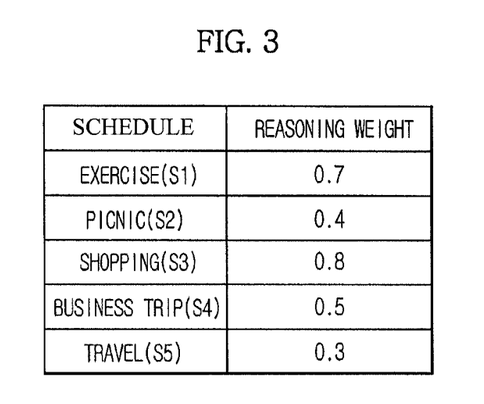
FIG. 3 is a table illustrating reasoning weights which are initially set with respect to schedules according to example embodiments.

As shown in FIG. 3, the reasoning weight storage unit 129 stores "0.7", "0.4", "0.8", "0.5" and "0.3" as the reasoning weight values which are initially set by the user, in correspondence with "exercise S1", "picnic S2", "shopping S3", "business trip S4", and "travel S5".

Figure 4:
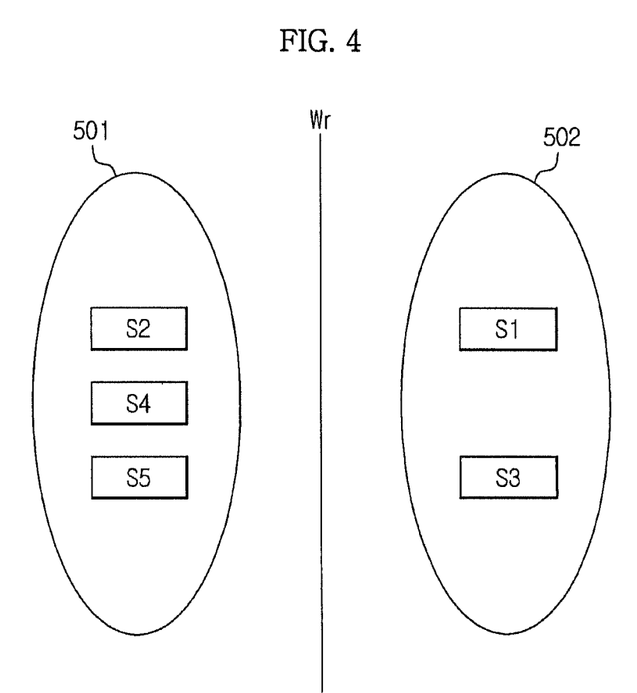
FIG. 4 is a diagram of an example of dividing schedules into two groups according to reasoning weights according to example embodiments.

As shown in FIG. 4, the schedules may be grouped into two groups 501 and 502 according to the reasoning weights of the schedules. The first group 501 may include schedules which do not require reasoning and such as "picnic S2", "business trip S4", and "travel S5" having reasoning weights less than a reference value Wr, for example, 0.6. The second group 502 may include schedules which require reasoning such as "exercise S1" and "shopping S3" having reasoning weights greater than the reference value Wr of 0.6.

The conversation management unit 130 may determine whether reasoning is performed, according to the results of comparing the reasoning weights of the schedules stored in the reasoning weight storage unit 129 with the reference value. Thus, a Bayesian network may be used as a probabilistic reasoning method or a description logic may be used as a logical reasoning method.

If reasoning is necessary, the reasoning unit 128 may obtain adequate schedule information using the schedule management database 142, the web information database 143 and the situation information database 144 of the database unit 140. For example, if it is determined that "exercise" is necessary as a schedule to be recommended after interpreting speech "How's today's weather?" input by the user 10, the robot may perform reasoning using the prepared schedule information, the weather information and the user state information and output a response according to the reasoned result. For example, the robot may audibly output "Since you don't have anything scheduled this afternoon, and the weather is nice, I recommend you go for a run outside."

If the user 10 reacts to the response of the interactive robot 100, the conversation management unit 130 may store the evaluated result according to the reaction of the user in the evaluation information database 145. Whenever the reaction of the user is evaluated, the evaluation information of the evaluation information database 145 may be updated. The evaluation of the user may be roughly divided into "satisfaction", "dissatisfaction" and "normal." For example, if the user 10 says "good" or "nice" with respect to the response of the interactive robot 100, the evaluated result may be "satisfaction." In contrast, when the user 10 says "no good" or "bad", the evaluated result may be "dissatisfaction." With respect to other reactions, the evaluated result may be "normal".

When the interactive robot 100 responds or the user evaluates the response of the robot, the reasoning unit 128 may update the reasoning weight of a schedule and store the updated reasoning weight in the reasoning weight storage unit 129.

Figure 5:
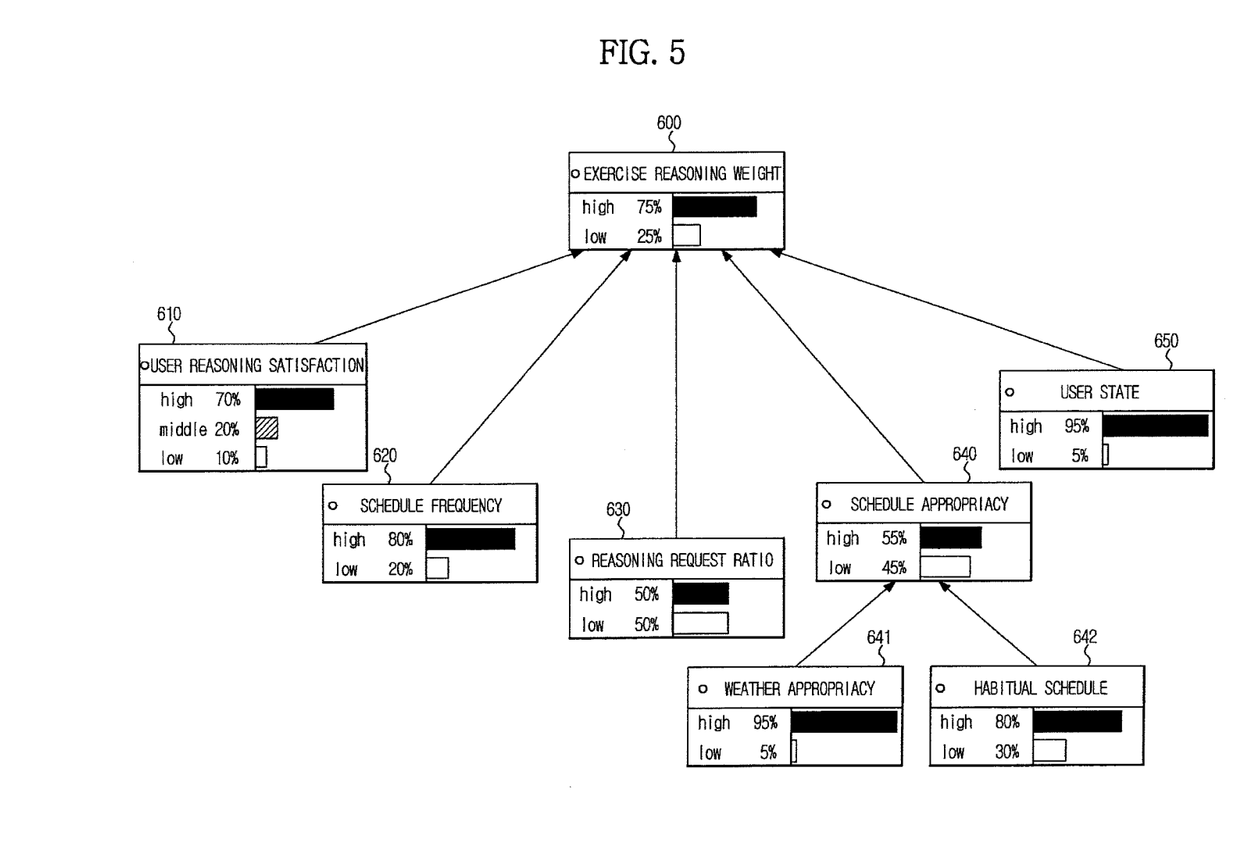
FIG. 5 is a diagram illustrating an operation to update an exercise reasoning weight according to example embodiments.

FIG. 5 is a diagram illustrating an operation to update an exercise reasoning weight according to example embodiments.

As shown, an exercise reasoning weight 600 corresponding to exercise may be stored in the database unit 140 and may be calculated using, for example, six information items. The six information items may include user reasoning satisfaction 610, schedule frequency 620, reasoning request ratio 630, schedule appropriacy 640 and user state 650. The user reasoning satisfaction 610 probabilistically indicates the satisfaction of the user 10 when exercise schedule information is provided, and is divided into "high", "middle" and "low." The schedule frequency 620 probabilistically indicates a schedule frequency corresponding to the number of schedules in order to check a schedule concentration state, and is divided into "high" and "low." The reasoning request ratio 630 probabilistically indicates a frequency in which the user 10 requests reasoning of a schedule for exercise, and is divided into "high and "low." The schedule appropriacy 640 probabilistically indicates a degree that exercise is appropriate according to weather appropriacy 641 and a habitual schedule 642. The weather appropriacy 641 probabilistically indicates a degree that the weather is suitable for exercise, and is divided into "high" and "low." The habitual schedule 642 probabilistically indicates how frequently the user exercises, and is divided into "high" and "low."

Although the six information items are used when the exercise reasoning weight is updated in the example embodiments, an information item closely associated with the exercise schedule information may be added. Similarly, the number of information items used when the reasoning weight of another schedule is updated may be changed.

When the reasoning unit 128 obtains the reasoning weight of each of the schedules using numerical values which are probabilistically set with respect to the plurality of information items, the reasoning weight may be calculated using the Bayesian network and may be updated to the calculated reasoning weight. Although the Bayesian network is used when the reasoning weight is calculated in the example embodiments, the example embodiments are not limited thereto and any method may be used if the weight may be adequately set according to the information item associated with the schedule.

If the reasoning weight of the schedule is updated, a more adequate schedule may be recommended to the user later.

Figure 6A:
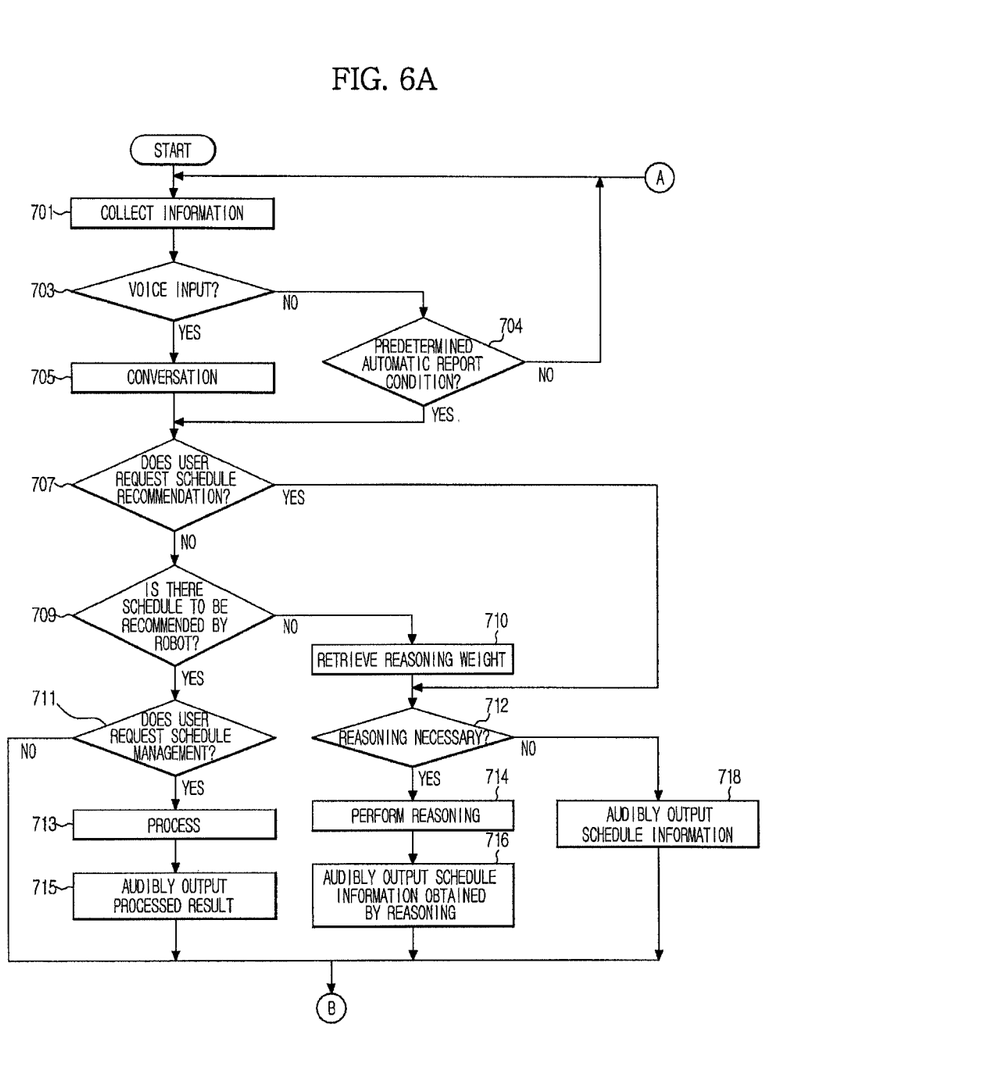
FIGS. 6A and 6B are flowcharts illustrating a schedule management method using an interactive robot according to example embodiments.
Figure 6B:
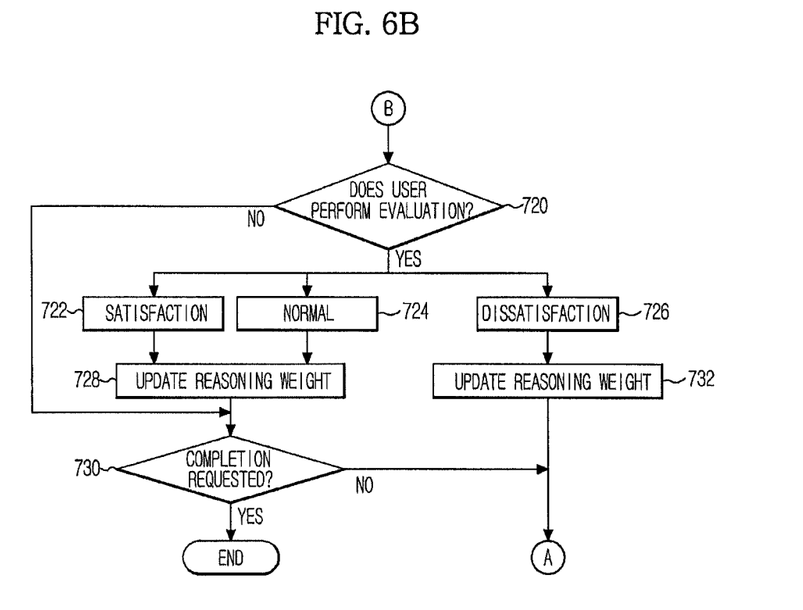

FIGS. 6A and 6B are flowcharts illustrating a schedule management method using an interactive robot according to example embodiments.

If an operation is activated by power supply, the interactive robot 100 may collect information. For example, when the registration, retrieval, modification or deletion of the schedules is executed for schedule management, when schedule information obtained by reasoning or retrieved schedule information is audibly output and the user evaluates the schedule information, or when environment information measured by the sensor unit 110 or information received from the schedule management server 300 and the web server 400 via the network 200 is changed, the collected information may be stored in the database unit 140 (701).

If a voice is input according to a request of the user 10 (Yes in 703), the interactive robot 100 may move to a location appropriately separated from the user 10 in response to the request and audibly converse with the user 10 (705).

During conversation, the robot may understand the text of the language of the user through the voice input unit 121 and the voice recognition unit 125 and respond thereto.

If the schedule report condition is satisfied during conversation without the calling of the user (Yes in 704), it may be determined whether the user 10 requests recommendation of an adequate schedule (707). If the user 10 does not request the recommendation of the schedule as the result of analyzing the speech of the user or as the result of determining whether the predetermined report condition is satisfied, it may be determined whether there is a schedule to be recommended by the robot itself (709). If there is no schedule to be recommended by the robot itself, it may be determined whether the user requests schedule management (711).

If the user requests schedule management in order to perform the registration, retrieval, modification and deletion of the schedule (Yes in 711), the request may be processed (713). The conversation management unit 130 may audibly output the processed result through the voice output unit 122 (715). In addition, the processed result may be stored in the schedule management database 142 and may be stored in the schedule management server 300 via the network 200.

If the robot has the schedule to be recommended (Yes in 709), the conversation management unit 130 may retrieve the reasoning weight of the schedule to be recommended, which may be stored in the reasoning weight storage unit 129 (710).

If the user 10 requests recommendation of an appropriate schedule (Yes in 707) or if the search of the reasoning weight is completed, the conversation management unit 130 may determine whether reasoning is necessary (712).

If it is determined that reasoning is necessary for obtaining the schedule information as the result of analyzing the conversation in which the user requests schedule recommendation or if reasoning is necessary because the retrieved reasoning weight is greater than the reference value Wr (Yes of 712), the reasoning unit 128 may use the Bayesian network as the probabilistic reasoning method or may use the description as the logical reasoning method to obtain the information about the adequate schedule. The information about the adequate schedule may be obtained using the schedule management database 142, the web information database 143 and the situation information database 144 of the database unit 140, regardless of which of the methods is used (714). Then, the conversation management unit 130 may transform the obtained schedule information into a voice signal using the voice synthesis unit 126 and output the voice signal via the voice output unit 123 (716).

For example, if it is determined that "exercise" is necessary as the schedule to be recommended after interpreting the speech "How's today's weather?" input by the user 10, the robot may audibly output "Since you don't have anything scheduled this afternoon, and the weather is nice, I recommend you go for a run outside" to the user 10 according to the result reasoned using the information of the database unit 140. As another example, if the user 10 requests the recommendation of the schedule like "How about a business trip to Pusan tomorrow?" and the schedule overlaps with another schedule as the reasoned result, "A business trip to Pusan cannot be scheduled for tomorrow, because a meeting is scheduled for tomorrow in Seoul," may be audibly output to the user.

If it is determined that reasoning is not necessary to obtain the schedule information as the result of analyzing the conversation in which the user requests the recommendation of the schedule or if reasoning is not necessary because the retrieved reasoning weight is not greater than the reference value Wr (No in 712), the schedule management information stored in the schedule management database 142 or the schedule management information stored in the schedule management server 300 may be retrieved and the schedule information is audibly output (718). For example, after interpreting speech "Please report tonight's schedule" input by the user 10, "A meeting is scheduled for tonight" may be audibly output to the user 10 according to the retrieved result.

If the user responds to the case where the processed result for schedule management is audibly output (715), the case where the schedule information obtained by reasoning is audibly output (716) or the case where the schedule information is audibly output according to the retrieved result, the conversation management unit 130 may determine that the user performs evaluation (Yes in 720). Then, the conversation management unit 130 may determine whether the evaluation of the user is "satisfaction", "dissatisfaction" or "normal" and store the evaluation of the user in the evaluation information database 145 or update the evaluation information database (722, 724, 726).

If the evaluation of the user is "satisfaction" or "normal", the reasoning unit 128 may calculate the reasoning weight of each schedule and update the reasoning weight stored in the reasoning weight storage unit 129 to the calculated reasoning weight, in order to apply an information change factor (728). When the reasoning weight is calculated, the Bayesian network may be used, but the method is not limited thereto. If the user 10 requests completion (Yes in 730), the interactive robot 100 may complete the overall operation.

If the evaluation of the user is "dissatisfaction," the reasoning unit 128 may calculate the reasoning weight of each schedule and may update the reasoning weight stored in the reasoning weight storage unit 129 to the calculated reasoning weight, in order to apply an information change factor (732). Then, the method may return to the start operation in order to receive the user's request again.

The above-described embodiments may be recorded in computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although embodiments have been shown and described, it should be appreciated by those skilled in the art that changes may be made in these embodiments without departing from the principles and spirit of the disclosure, the scope of which is defined in the claims and their equivalents.

What is claimed is:

1. A schedule management system using an interactive robot, the schedule management system comprising the interactive robot audibly communicating with a user,
wherein the interactive robot includes:
a conversation management unit to determine whether reasoning is performed to obtain schedule information to be provided to the user without a request from the user for a schedule recommendation and to control an operation to audibly provide the obtained schedule information to the user;
a reasoning unit to perform the reasoning using information collected by the interactive robot to obtain the schedule information when it is determined that the reasoning is to be performed, and to provide the obtained schedule information to the conversation management unit; and
a reasoning weight storage unit to store the reasoning weights indicating reasoning appropriacy of schedules which are used by the conversation management unit to determine whether the reasoning is performed.

2. The schedule management system according to claim 1, wherein:
if there is at least one schedule to be recommended by the robot, the conversation management unit determines whether the reasoning is performed according to a reasoning weight corresponding to the schedule to be recommended.

3. The schedule management system according to claim 1, wherein the reasoning unit performs reasoning using a probabilistic reasoning method or a logic reasoning method to obtain the schedule information.

4. The schedule management system according to claim 2, wherein the conversation management unit analyzes conversation to determine whether there is a schedule to be recommended by the robot.

5. The schedule management system according to claim 2, wherein the conversation management unit compares the reasoning weights of the schedules with a reference value to divide the schedules into a first group of schedules which do not require reasoning and a second group of schedules which require reasoning, and determines whether reasoning is performed depending on a group of the schedule to be recommended.

6. The schedule management system according to claim 2, wherein the reasoning unit updates the reasoning weights which are initially set in the reasoning weight storage unit.

7. The schedule management system according to claim 6, further comprising a schedule management server and a web server connected to the interactive robot via a network.

8. The schedule management system according to claim 7, wherein the interactive robot further includes a database unit including:
a situation information database having a storage to store situation information including a peripheral environment of the robot and a user state;
a schedule management database having a storage to store schedule management information about registration, retrieval, modification or deletion of a schedule for schedule management, which is provided by the schedule management server;
a web information database having a storage to store web information associated with weather, news and events collected in a web environment from the web server;
an evaluation information database having a storage to store user evaluation information according to reaction of the user during conversation; and
a recommendation information database having a storage to store recommendation information including information indicating whether there is a schedule to be recommended and a recommendation frequency that indicates a frequency in which the user requests the schedule recommendation.

9. The schedule management system according to claim 8, wherein the reasoning unit performs reasoning using at least one piece of information stored in the database unit to calculate the reasoning weights and updates the reasoning weights to the calculated reasoning weights.

10. The schedule management system according to claim 9, wherein the reasoning unit calculates the reasoning weights using a Bayesian network.

11. The schedule management system according to claim 1, wherein the interactive robot audibly outputs the schedule information if a schedule report condition set in advance is satisfied.

12. A schedule management method using an interactive robot, the schedule management method comprising:
determining, by a computer, whether reasoning is performed, using a reasoning weight in order to obtain schedule information to be provided to a user without a request from the user for schedule recommendation during conversation between the interactive robot and the user, wherein the reasoning weight indicates reasoning appropriacy of each schedule;
performing the reasoning, by the computer, using information collected by the interactive robot to obtain the schedule information when it is determined that the reasoning is to be performed; and
audibly outputting, by the computer, the schedule information obtained by reasoning to provide the schedule information to the user.

13. The schedule management system according to claim 12, wherein one of a probabilistic reasoning method and a logical reasoning method is used in order to obtain the schedule information.

14. The schedule management method according to claim 12, further
comprising analyzing conversation to determine whether there is a schedule to be recommended to the user by the robot itself; and
comparing a reasoning weight of the schedule to be recommended with a reference value to determine whether reasoning is performed based on the determination that the schedule to be recommended exists.

15. The schedule management method according to claim 14, wherein the reasoning weight is updated using the information collected by the interactive robot.

16. The schedule management method according to claim 15,
wherein the collected information includes:
situation information including a peripheral environment of the robot and a user state;
schedule management information about registration, retrieval, modification or deletion of a schedule for schedule management;
web information associated with weather, news and events collected in a web environment;
user evaluation information according to reaction of the user during conversation; and
recommendation information including information indicating whether there is a schedule to be recommended and a recommendation frequency that indicates a frequency in which the user requests the schedule recommendation.

17. The schedule management method according to claim 16, wherein:
reasoning is performed using one piece of the collected information to calculate a reasoning weight and the reasoning weight is updated to the calculated reasoning weight, and
a Bayesian network is used as a reasoning method calculating the reasoning weight.

18. The schedule management method according to claim 12, wherein the schedule information is audibly output if a schedule report condition set in advance is satisfied.

19. At least one non-transitory computer readable medium comprising computer readable instructions that control at least one processor to implement the method of claim 12.

* * * * *

UNITED STATES PATENT AND TRADEMARK OFFICE
CERTIFICATE OF CORRECTION

PATENT NO.        : 8,838,505 B2
APPLICATION NO.   : 12/948397
DATED             : September 16, 2014
INVENTOR(S)       : Jun Won Jang et al.

It is certified that error appears in the above-identified patent and that said Letters Patent is hereby corrected as shown below:

In the Claims

Column 12, line 12, in claim 13, delete "system" insert -- method --, therefore

Signed and Sealed this
Fifth Day of May, 2015

Michelle K. Lee
*Director of the United States Patent and Trademark Office*